(12) United States Patent
Greiner

(10) Patent No.: US 8,950,145 B2
(45) Date of Patent: Feb. 10, 2015

(54) LINING

(75) Inventor: Switbert Greiner, Oberaichen (DE)

(73) Assignee: Greiner & Gutmann GbR, Oberaichen (DE)

( * ) Notice: Subject to any disclaimer, the term of this patent is extended or adjusted under 35 U.S.C. 154(b) by 0 days.

(21) Appl. No.: 13/331,668

(22) Filed: Dec. 20, 2011

(65) Prior Publication Data

US 2012/0153081 A1  Jun. 21, 2012

(30) Foreign Application Priority Data

Dec. 21, 2010  (DE) .................... 10 2010 055 461

(51) Int. Cl.
*E04B 9/00* (2006.01)
*B64C 1/06* (2006.01)
*E04B 9/30* (2006.01)

(52) U.S. Cl.
CPC ............. *B64C 1/066* (2013.01); *E04B 9/303* (2013.01)
USPC ..................................... 52/506.03

(58) Field of Classification Search
CPC . E04B 9/303; E04B 9/047; E04B 2001/3241; B64D 11/003; E04H 15/00; E04H 15/18; E04H 15/20; E04H 15/22; E04H 15/34; E04H 15/36; E04H 15/40; E04H 2015/203
USPC ............ 52/506.01, 506.03, 506.04, 506.05, 52/506.06, 506.07, 506.08, 506.09, 511, 3, 52/78; 428/101
See application file for complete search history.

(56) References Cited

U.S. PATENT DOCUMENTS

| 2,302,547 | A | * | 11/1942 | Hasenburger et al. ......... 52/273 |
| 2,905,230 | A | * | 9/1959 | Gabriel ....................... 297/410 |
| 3,443,671 | A | * | 5/1969 | Dyke ........................... 190/103 |
| 4,112,556 | A | * | 9/1978 | Flaum et al. ..................... 24/382 |
| 6,609,598 | B2 | * | 8/2003 | Hsu ............................. 190/103 |
| 6,654,968 | B2 | * | 12/2003 | Braun et al. ...................... 2/269 |
| 8,245,464 | B2 | * | 8/2012 | Saiz et al. ....................... 52/222 |
| 2005/0235592 | A1 | * | 10/2005 | Scherrer et al. ............ 52/506.06 |
| 2007/0039250 | A1 | * | 2/2007 | Morris ............................. 52/22 |
| 2008/0067309 | A1 |   | 3/2008 | Taba et al. |

(Continued)

FOREIGN PATENT DOCUMENTS

| DE | 6808827 | 11/1968 |
| DE | 102005035174 A1 | 2/2007 |
| DE | 102005040571 A1 | 3/2007 |

(Continued)

OTHER PUBLICATIONS

European Search Report EP 2468976 A1, May 8, 2012.

*Primary Examiner* — Jessica Laux
(74) *Attorney, Agent, or Firm* — Hoffman Warnick LLC

(57) ABSTRACT

A lining comprising at least two opposing profiled frame elements in spaced relationship to each other, at least one membrane element disposed between said profiled frame elements and connected to said profiled frame elements, at least partially, by means of rearwardly engaging fastening means and at least one taughtening means adapted to taughten said membrane element between said profiled frame elements. The membrane element has, as taughtening means, at least one taughtening zip fastener, wherein the state of the membrane element can be changed, by closing the taughtening zip fastener, to a state in which it is taughtened between the profiled frame elements. Installation and opening of the membrane field can be significantly simplified by the inclusion of a second, so-called access zip fastener.

9 Claims, 12 Drawing Sheets

(56) References Cited

U.S. PATENT DOCUMENTS

2010/0050543 A1 3/2010 Greiner et al.
2010/0269311 A1* 10/2010 Jacobsen .................. 24/382

FOREIGN PATENT DOCUMENTS

| DE | 102007001376 A1 | 7/2008 |
|----|-----------------|--------|
| DE | 102009010861 A1 | 10/2009 |
| EP | 0382478 A2 | 8/1990 |
| EP | 1001403 A2 | 5/2000 |
| FR | 1518396 | 3/1968 |
| WO | 03086781 A1 | 10/2003 |

* cited by examiner

LINING

The present invention relates to a lining for surfaces, more particularly ceilings or walls, as defined in the generic clause of claim 1. The invention further relates to an attachment and taughtening means as defined in claim 13.

A lining known in the prior art comprises at least two opposing profiled frame elements, which are located in spaced relationship to each other, at least one membrane element disposed between the profiled frame elements and at least partially connected to the profiled frame elements with the aid of connecting means that engages the profiled frame elements in a direction from the rear thereof, i.e. rearwardly engages said elements, and at least one taughtening means for taughtening the membrane element between the profiled frame elements.

A lining of the above type is disclosed, for example, in DE 10 2007 001 376 A1 and DE 10 2005 035 174 A1.

It is an object of the invention to provide a lining and an attachment and taughtening means that enables a membrane element to be installed and taughtened in a simple manner.

This object is achieved by a lining having the features of claim 1 and an attachment and taughtening means having the features of claim 13. Advantageous embodiments and variants of the lining of the invention and of the attachment and taughtening means of the invention are specified in the dependent claims and are further explained in the following description, more particularly with reference to the figures.

According to the invention, the lining of the above type is characterized in that the membrane element comprises at least one taughtening zip fastener as the taughtening means, and the state of the membrane element can be changed, by closing the taughtening zip fastener, to a state in which it is held taught between the profiled frame elements.

A first basic concept of the invention may be regarded as residing in the provision of the membrane element with taughtening means such that the latter can itself cause the membrane element to be taughtened. Basically, it is thus not necessary to move the profiled frame elements to which the membrane element is attached, in order to taughten the membrane element.

Taughtening of the membrane element can be achieved in a simple manner by closing the taughtening zip fastener. Conversely, the membrane element can be slackened by opening the taughtening zip fastener.

An important advantage of the lining of the invention is that the profiled frame elements that are required to absorb considerable forces, depending on the tensile load on the membrane element and its size, can basically be in the form of rigid and immovable components. There is thus a constructional separation of the functions of supporting and taughtening the membrane element. The function of supporting the membrane element is carried out by the profiled frame elements, while the function of taughtening the membrane element is carried out by the at least one taughtening zip fastener which is a component of the membrane element.

The taughtening zip fastener can be a conventional zip fastener comprising teeth made of, say, metal or a plastics material. Alternatively, the taughtening zip fastener can be in the form of a toothless zip fastener.

In a preferred embodiment of the invention, there is provided at least a first pair of profiled frame elements and a second pair of profiled frame elements extending transversley angles to the first pair of profiled frame elements, and the membrane element can be taughtened biaxially between the profiled frame elements. The term "biaxial taughtening of the membrane element" is to be understood to mean that the membrane element can be taughtened in two directions in space. The process of taughtening biaxially can provide a crease-free and smooth membrane element. The taughtened membrane element can resist loads resiliently and return to its original shape when the load is removed.

For the purpose of attaching the membrane element to the profiled frame elements, the membrane element is in a preferred embodiment connected to the first pair of profiled frame elements and also to the second pair of profiled frame elements, at least in part, with the aid of connecting means that rearwardly engages the profiled frame elements.

Preferably, there are provided at least two taughtening zip fasteners for biaxially stretching the membrane element, a first taughtening zip fastener extending toward the first pair of profiled frame elements and a second taughtening zip fastener extending toward the second pair of profiled frame elements. Very preferably, the taughtening zip fasteners are each parallel to the respective profiled frame elements.

In a preferred embodiment, the membrane element has a rectangular or square membrane surface. For the purpose of stretching the membrane element in two directions in space, the taughtening zip fasteners preferably are transversely to each other and are parallel to the edges of the membrane element.

The process of taughtening the membrane element can be simplified by providing at least two taughtening zip fasteners that are substantially parallel to each other. By means of the at least two taughtening zip fasteners, the membrane element can be taughtened in two stages, in which a first taughtening zip fastener is first closed, after which a second taughtening zip fastener is closed. Thus the total tensile load on the membrane element can be distributed over a plurality of zip fasteners. In order to achieve simplified biaxial taughtening of the membrane element, there are provided at least four taughtening zip fasteners, that is, two pairs of parallel zip fasteners.

In a preferred embodiment, at least one separate taughtening zip fastener is assigned to each profiled frame element. In the case of four profiled frame elements extending along the borders of a rectangular or square membrane element, the latter will comprises at least four taughtening zip fasteners, that is, two pairs of preferably parallel zip fasteners. Thus the membrane element can be taughtened in the two directions in two steps by means of two separate taughtening zip fasteners. Preferably, the taughtening zip fasteners are each disposed at the edges of the membrane element.

According to the invention, it is preferred that at least one keder connection be provided as the connecting means rearwardly engaging the profiled frame elements. A keder connection is characterized by a keder and a keder groove, in which the keder is displaceably guided along a longitudinal axis of the keder groove. Preferably, there is provided one keder connection in a longitudinal transverse of the membrane element and one in the transverse direction thereof.

As a result of the longitudinal displaceability of the keder in the keder groove, expansion of the membrane element occurring when the latter is taughtened can be accommodated or compensated. This is particularly advantageous when the membrane element is taughtened biaxially, in which case expansion of the membrane occurs regularly in two directions in space at the border regions of the membrane element. As a result of the keder connection, the membrane element can slide along the profiled frame elements whilst being taughtened.

By means of the keder connection, the membrane element can thus be taughtened in a transverse direction relatively to the keder or the keder groove, and the membrane element is capable of being moved in the longitudinal direction of the keder or the keder groove.

In a preferred embodiment of the keder connection, the membrane element has a keder and the profiled frame element has a keder groove. The keder can slide along the keder groove in the slack state and in the taughtened state of the membrane element so that longitudinal displaceability of the membrane element in the longitudinal direction of the keder groove is ensured.

A particularly simple method of installing the membrane element together with an uncomplicated method of taughtening the same can be achieved in that the membrane element comprises at least one taughtening zip fastener comprising two closure bands and a membrane, a first closure band being formed at a border region of the membrane and a second closure band comprising a reinforced edge, more particularly a keder, as part of a connecting means rearwardly engaging the profiled frame element for the purpose of attaching the membrane element to the profiled frame element.

As a result of the combination of a taughtening zip fastener and an integrated reinforced edge or an integrated keder, an attachment and taughtening means is provided such that, on the one hand, it enables the membrane element to be attached to a profiled frame element with the possibility of longitudinal displaceability of the membrane element for compensation of expansion thereof and, on the other hand, it allows taughtening of the membrane element.

Basically, the taughtening zip fastener can comprise two strips of fabric as the closure bands in the manner of a zip fastener known per se, which closure bands are each provided with teeth adapted to mesh with each other.

The first closure band can be integral with the membrane to form a part thereof or it can be attached to the membrane in the form of a separate component. The taughtening zip fastener, more particularly the first closure band, can be attached to the membrane by sewing, gluing, or welding. The membrane can comprise a fabric or a plastics film or it can be made of the same, for example.

Preferably, the reinforced edge or the keder is located on that surface of the taughtening zip fastener that is remote from the membrane, more particularly at that end of the second closure band that is located opposite to the teeth of the second closure band. Preferably, the reinforced edge or the keder extends in a longitudinal direction of the taughtening zip fastener, more particularly parallel to the teeth of the zip fastener. Preferably, the reinforced edge or the keder contains a plastics material or it consists of a plastics material.

For the purpose of simplifying the taughtening procedure, the taughtening zip fastener preferably comprises two closure bands, and at least one connecting member is provided between the two closure bands, which connecting member delimits a gap formed between the closure bands when the taughtening zip fastener is open. Thus the connecting member joins the two closure bands together in such a way that the closure bands cannot be arbitrarily moved apart when the taughtening zip fastener is open. In spite of the taughtening zip fastener being open, the connecting member prevents complete separation of the closure bands from each other. The zip fastener can be closed more simply by virtue of the fact that the maximum gap between the two closure bands is restricted. Preferably, the connecting member is attached to both of the closure bands. For example, the connecting member is welded, glued, or sewn onto the same.

Furthermore, an advantageous effect of the connecting member is that the membrane element can be joined to the profiled frame elements in the form of a unit in a non-taught state when the taughtening zip fastener(s) is/are open. In particular, the keders provided on the membrane element can be inserted into the keder grooves provided on the profiled frame elements so as to be largely force-free, i.e. with no necessity to overcome tensile forces. After the membrane element has been connected to the profiled frame elements so as to rearwardly engage the same, the membrane element can be taughtened by closing the taughtening zip fastener(s).

In a preferred embodiment, the connecting member comprises a textile connecting strap that is disposed along the taughtening zip fastener. The connecting strap can be a textile strip, for example. Preferably, the connecting strap is joined to the first and second closure band of the taughtening zip fastener. The connecting strap is disposed such that it extends approximately parallel next to the taughtening zip fastener when the latter is closed.

The desired effect of the connecting strap, namely that of restricting the gap between the two closure bands, can also be achieved by sewing the closed zip fastener onto the membrane such that a bulge is formed in the membrane along the zip fastener, which bulge is similar to that provided by the connecting strap.

Instead of using a separate connecting strap, the desired effect can therefore be achieved by a specific manner of attaching the taughtening zip fastener to the membrane. In this case, the membrane exhibits a bulge in the attached state, which bulge is parallel to the taughtening zip fastener. Thus the connecting strap and the membrane can be one and the same piece of material. The connecting strap and the membrane can thus be a single piece or formed integrally. The connecting strap can be an integral component of the membrane.

Simple taughtening of the membrane element and, at the same time, improved access to a rear region of the membrane element is achieved when the connecting member comprises an access zip fastener along the taughtening zip fastener. Thus the connecting member comprises a further zip fastener that extends near to the taughtening zip fastener and is preferably parallel to the same. Preferably, the taughtening zip fastener and the access zip fastener are located at one and the same border region or in a central region of the membrane element. The access zip fastener and the taughtening zip fastener can also be referred to collectively as a double zip fastener. The two zip fasteners are disposed in relation to each other perpendicularly to the surface of the membrane. Thus not more than one of the zip fasteners is located in the plane of the membrane, while the second zip fastener is located away from the membrane plane.

Preferably, the taughtening zip fastener and the access zip fastener are disposed in such a way in relation to each other that a loose, closed, or pre-tensioned state of the membrane element can be achieved by closing the access zip fastener, and a taught state of the membrane element can be achieved by subsequently closing the taughtening zip fastener. When the access zip fastener is closed and the taughtening zip fastener is open, the connecting member restricts the gap between the closure bands of the taughtening zip fastener.

The advantages of a simple taughtening procedure for the membrane element and ease of access to a rear region thereof are combined by means of the access zip fastener provided in place of the connecting strap. When the access zip fastener is closed, the membrane element can be attached as a unit to the profiled frame elements. Furthermore, simple taughtening of the membrane element is made possible starting from a closed access zip fastener. By opening both zip fasteners, access to a rear region of the membrane element can be easily gained without having to completely remove the membrane element.

When attaching the membrane element to the profiled frame elements, a helpful and advantageous factor is that the membrane element can be moved freely between the profiled frame elements in a slack and/or pre-tensioned state, particularly when the taughtening zip fastener is open. Preferably, the membrane element can be inserted into the keder grooves of the profiled frame elements so as to be loose or largely free from forces. In this case, a gap having a width that is delimited by the connecting member opens up between the closure bands of the taughtening zip fastener. After the keders of the membrane element have been inserted into the keder grooves of the profiled frame elements, the membrane element can be easily taughtened by closing the taughtening zip fastener(s).

Basically, due to the use of the taughtening zip fastener(s), it is possible to taughten the membrane element without necessitating any movement of the profiled frame elements. Thus the profiled frame elements can be in the form of fixed, i.e. substantially immovable, border elements. However, for the purpose of additionally taughtening and/or adjusting the membrane element, it is preferred that at least one of the profiled frame elements be movable. In this case, it is preferred that the profiled frame element be displaceable in a direction extending transversely to a longitudinal axis of the keder connection. Thus the membrane element can additionally be made taught by increasing the distance between two opposing profiled frame elements.

A displaceability of the profiled frame elements can be ensured by suitably installing and attaching the profiled frame elements. There are preferably provided adjusting means, in the form of, for example, adjusting screws for moving the profiled frame elements.

The invention further relates to an attachment and taughtening means for membrane elements comprising a first closure band and a second closure band that form a taughtening zip fastener, and a reinforced edge is formed on one of the two closure bands in one longitudinal direction of the same, which reinforced edge can be inserted into a keder groove to form a connection that rearwardly engages the profiled frame element. Thus the attachment and taughtening means comprises a taughtening zip fastener comprising an integrated reinforced edge. The attachment and taughtening means provides of a mounting element that facilitates the attachment of a membrane element to a keder groove, on the one hand, and for taughtening of the membrane element on the other.

In a preferred embodiment, the reinforced edge is a keder. A particularly strong and permanent connection between the closure band and the keder can be achieved when the keder is connected permanently to the closure band particularly by means of extrusion or injection molding. More particularly, the closure band can be a textile strip, specifically a fabric web. By virtue of the fact that the keder, which can contain, or consist of, a plastics material, is applied to the closure band by means of extrusion or injection molding, the closure band is attached very securely to the keder so that tensile forces can be transferred. Very preferably, the closure band is embedded in the keder.

In a preferred embodiment, the attachment and taughtening means comprises a connecting member, as described in connection with the lining and with reference to the following figures. The additional features described in connection with the lining also relate appropriately to the attachment and taughtening means of the invention. The advantages described in connection with the lining are also achieved by the attachment and taughtening means of the invention.

The invention is described in more detail below with reference to preferred exemplary embodiments that are illustrated in the attached diagrammatic figures, in which.

Figure 1:
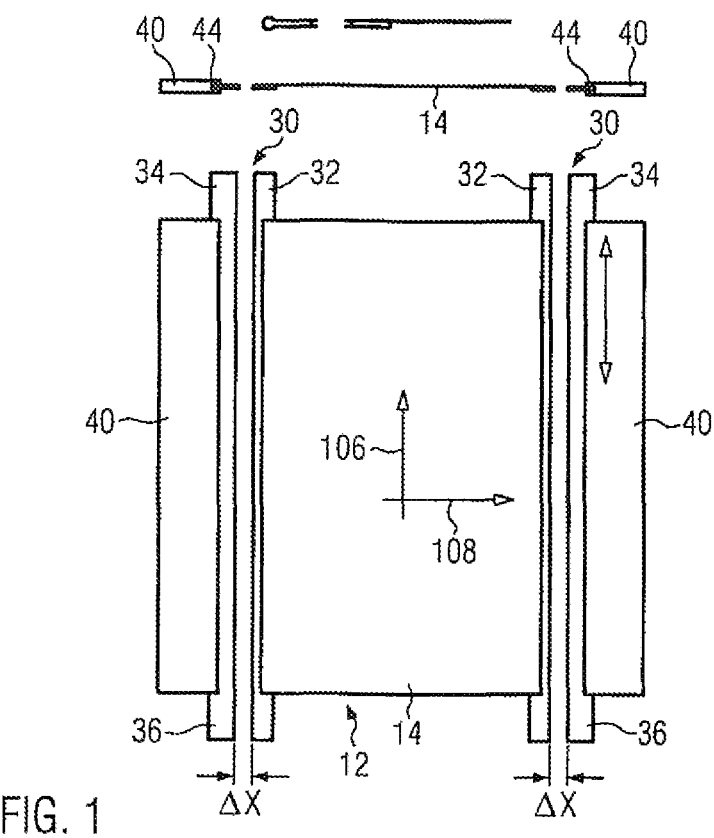
FIG. 1 shows a first embodiment of a lining of the invention.
Figure 3:
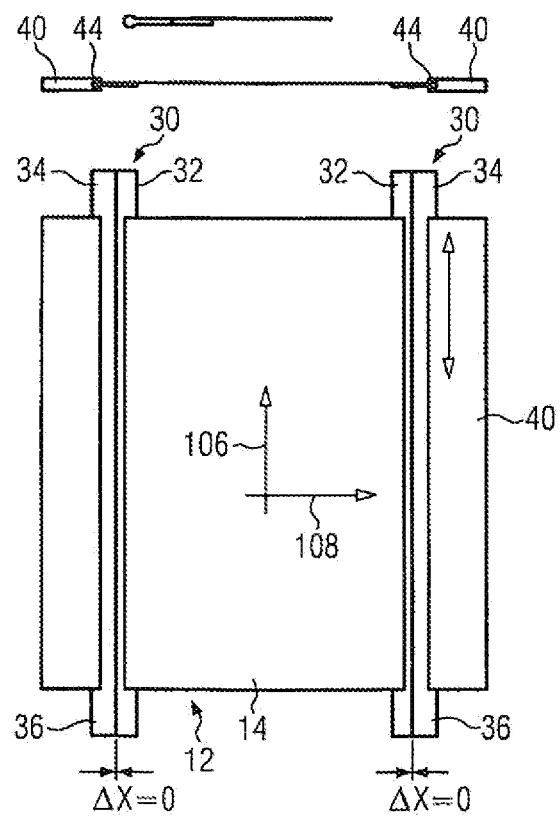
FIG. 3 shows the lining shown in FIG. 1 with closed taughtening zip fasteners.

A first embodiment of a lining 10 of the invention is shown in FIGS. 1 and 3. Like components are provided with like reference signs in all figures.

The lining 10 comprises a membrane system comprising two opposing profiled frame elements 40, which are parallel to each other and between which a membrane element 12 can be spanned.

The profiled frame elements 40 each comprise a keder groove 44 that extends along a longitudinal direction 106. For the purpose of attaching the membrane element 12 to the profiled frame elements 40, there is provided a keder 36 along the lateral border regions of the membrane element 12, which keder 36 can be inserted into the keder grooves 44 on the profiled frame elements 40 in the longitudinal direction 106. Thus the membrane element 12 is mounted for sliding along the profiled frame elements 40 in the longitudinal direction 106. The membrane elements extending in the transverse direction can be constructed in a similar fashion.

The membrane element 12 comprises a textile membrane 14 and two single or double taughtening zip fasteners 30 which are disposed along the longitudinal edges of the membrane 14 and which are used for stretching the membrane element 12 in a transverse direction 108 extending transversely to the longitudinal direction 106.

The taughtening zip fasteners 30 extend in the longitudinal direction 106 of the lining 10 and of the membrane element 12 and are parallel to the keder 36. The membrane element 12 or the membrane 14 can be stretched in the transverse direction 108 by closing the taughtening zip fasteners 30. Accordingly, the membrane element 12 can be slackened in the transverse direction 108 by opening the taughtening zip fasteners 30. In its slackened state, the membrane element 12 is mounted so as to slide quite freely in the keder grooves 44 of the profiled frame elements 40.

The taughtening zip fasteners 30 each comprise a first closure band 32 and a second closure band 34. The first closure band 32 is permanently joined to the membrane 14 so that tensile forces can be transferred thereto. For example, the first closure band 32 is welded or sewn onto the membrane 14. A keder 36 that has been inserted into the keder groove 44 is attached to the second closure band 34. The taughtening zip fastener 30 and the keder 36 form the attachment and taughtening means.

FIG. 1 shows the lining 10 in an open state. In this state, the taughtening zip fasteners 30 are open, at least in part, and the membrane 14 is in a slackened state. There is a gap or a space Δx between the first closure bands 32 and the second closure bands 34.

Figure 2:
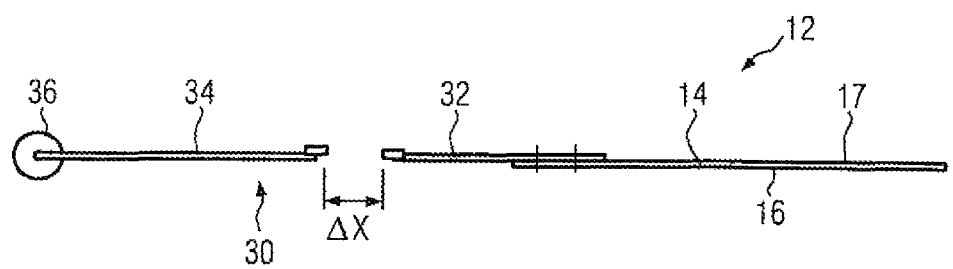
FIG. 2 is a cross-sectional view of an open taughtening zip fastener.

FIG. 2 is a cross-sectional view of the open taughtening zip fastener 30 together with the membrane 14. The membrane element 12 comprises a face side 16 and a reverse side 17. The taughtening zip fastener 30 is attached to the reverse side 17 of the membrane 14. The second closure band 34 of the taughtening zip fastener 30 is embedded in the keder 36 and is permanently and positively joined to the same. To achieve this end, the keder 36 can be extruded onto or injection molded onto the second closure band 34.

The membrane 14 is shown in a taughtened state in FIG. 3. To this end, the taughtening zip fasteners 30 are closed and there is no longer any gap existing between the closure bands. The membrane 14 is taughtened in the transverse direction 108. The membrane 14 can still be moved in the longitudinal direction 106 along the profiled frame elements 40 in spite of its taughtened state. Thus the keders 36 are axially movable in the keder grooves 44.

Figure 4:
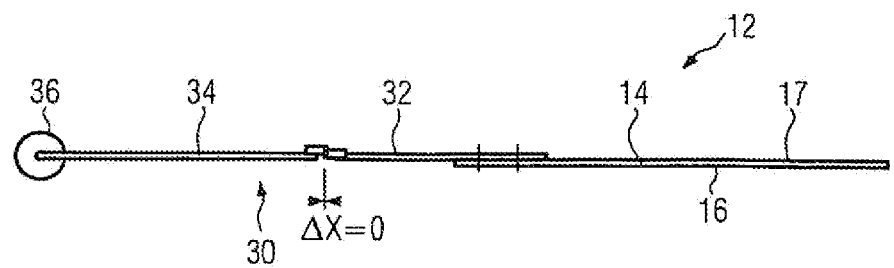
FIG. 4 is a cross-sectional view of a closed taughtening zip fastener.

FIG. 4 is a cross-sectional view of the taughtening zip fastener 30 in its closed state.

Figure 5:
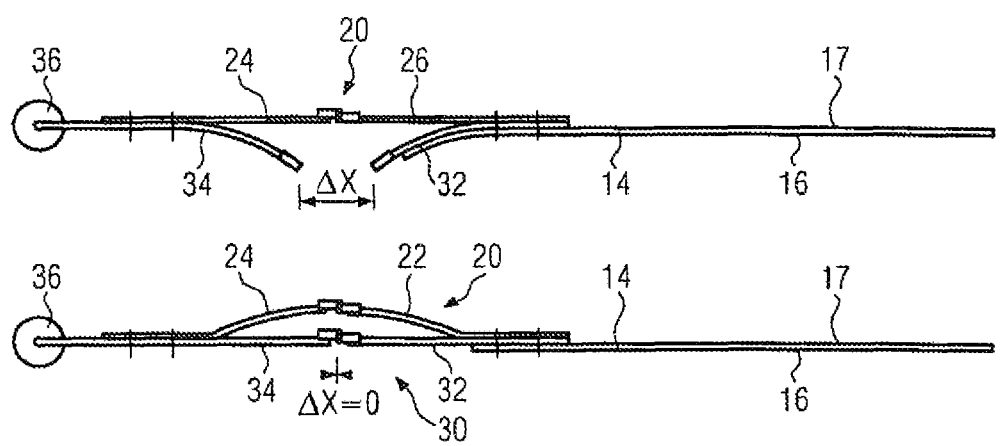
FIG. 5 is a cross-sectional view of a membrane element comprising a double zip fastener.

A second embodiment of a lining of the invention or an attachment and taughtening means of the invention is shown in FIG. 5. In this embodiment, there are disposed two zip fasteners 20, 30 on each longitudinal side of the membrane 14. The zip fasteners 20, 30 can also be referred to collectively as double zip fasteners and they comprise an access zip fastener 20 and a taughtening zip fastener 30.

Thus the second embodiment is characterized in that an access zip fastener 20 is assigned to at least one of the taughtening zip fasteners 30 of the lining 10.

As shown in FIG. 5, the taughtening zip fastener 30 is disposed on the face side 16 of the membrane element 12. The access zip fastener 20 is a connecting member and is located on the reverse side 17 of the membrane element 12 so that it is hardly visible when the taughtening zip fastener 30 is closed. The zip fasteners 20, 30 are not disposed one after the other in the direction of the membrane surface, but are instead located vertically near each other or on top of each other.

The taughtening zip fastener 30 comprises a first closure band 32 and a second closure band 34 that is embedded in a keder 36 and is permanently connected to the same for the transfer of taughtening forces thereto. The construction of the taughtening zip fastener 30 is the same as that of the first embodiment so that a detailed description thereof is no longer necessary at this stage.

The access zip fastener 20 comprises a first closure band 22 and a second closure band 24 and has been applied to the taughtening zip fastener 30 or otherwise attached to the same. The access zip fastener 20 defines a maximum width of the membrane element 12 that allows said membrane element to be readily threaded or inserted into the keder grooves 44 without being subjected to transverse stresses. When the access zip fastener 20 is closed and the taughtening zip fastener 30 is open, the membrane element 12 is mainly loose and thus in an unstressed or only slightly taughtened state. In this state, there is a gap Δx between the closure bands 32, 34 of the taughtening zip fastener 30. Thus the membrane element 12 can be attached with particular ease to the profiled frame elements 40 in this state by inserting the keder 36 into the keder grooves 44. Before the membrane element 12 is tensioned, the gap Δx typically ranges from approximately 0.5 to 1.0% of the width of the membrane element 12.

After threading in the membrane element 12 and optionally applying a longitudinal bias, the gap is removed by closing the taughtening zip fastener 30, by which means the membrane element 12 or the membrane 14 is made taught. Unlike the access zip fastener 20, the taughtening zip fastener 30 is disposed such that the access zip fastener 20 is relieved of tension when the taughtening zip fastener 30 is closed. In this state, the access zip fastener 20 can bulge upwardly, as can be seen in the figures, more particularly in FIG. 5. Both zip fasteners 20, 30 can be opened and closed again for inspection purposes.

Figure 6:
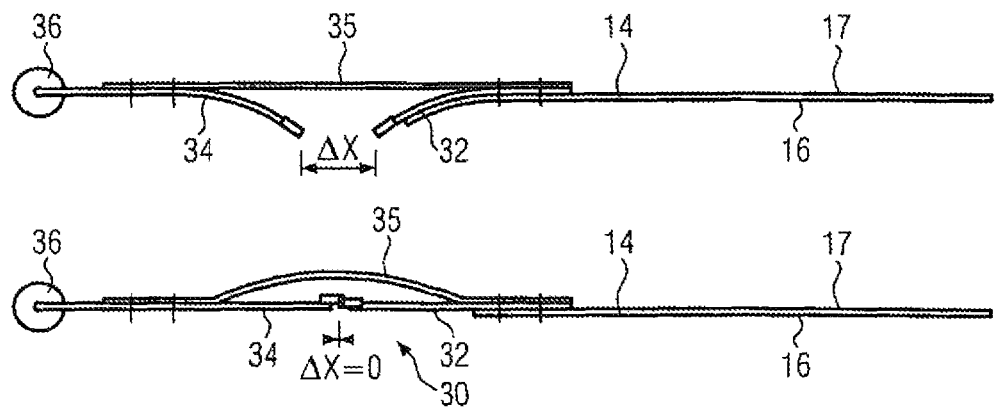
FIG. 6 is a cross-sectional view of a membrane element comprising a taughtening zip fastener and a connecting strap.

A further embodiment of a zip fastener or an attachment and taughtening means is shown in FIG. 6. In place of the double zip fastener shown in FIG. 5, there is provided a taughtening zip fastener 30, on each side of which there is disposed a connecting strap 35 to form a connecting member. The connecting strap 35 joins the two closure bands 32, 34 of the taughtening zip fastener 30. The gap Δx of the open taughtening zip fastener 30 is restricted by the connecting strap 35. The connecting strap 35 can be made of, say, a textile strip that is permanently connected to the two closure bands 32, 34. To this end, the connecting strap 35 can be sewn or welded onto the closure bands, for example. As shown in FIG. 6, the connecting strap 35 is preferably attached to the reverse side 17 of the membrane element 12 so that it is hardly visible when the taughtening zip fastener 30 is closed. When the taughtening zip fastener 30 is closed, the connecting strap 35 is loose or relieved of tension and it can bulge upwardly relatively to the membrane surface.

The same effect can alternatively be achieved by appropriately sewing a pre-bulged membrane 14 above the taughtening zip fastener 30. Instead of the connecting strap 35, the zip fastener 30 can thus be sewn directly onto the pre-bulged membrane 14 disposed above the zip fastener 30.

Figure 7:
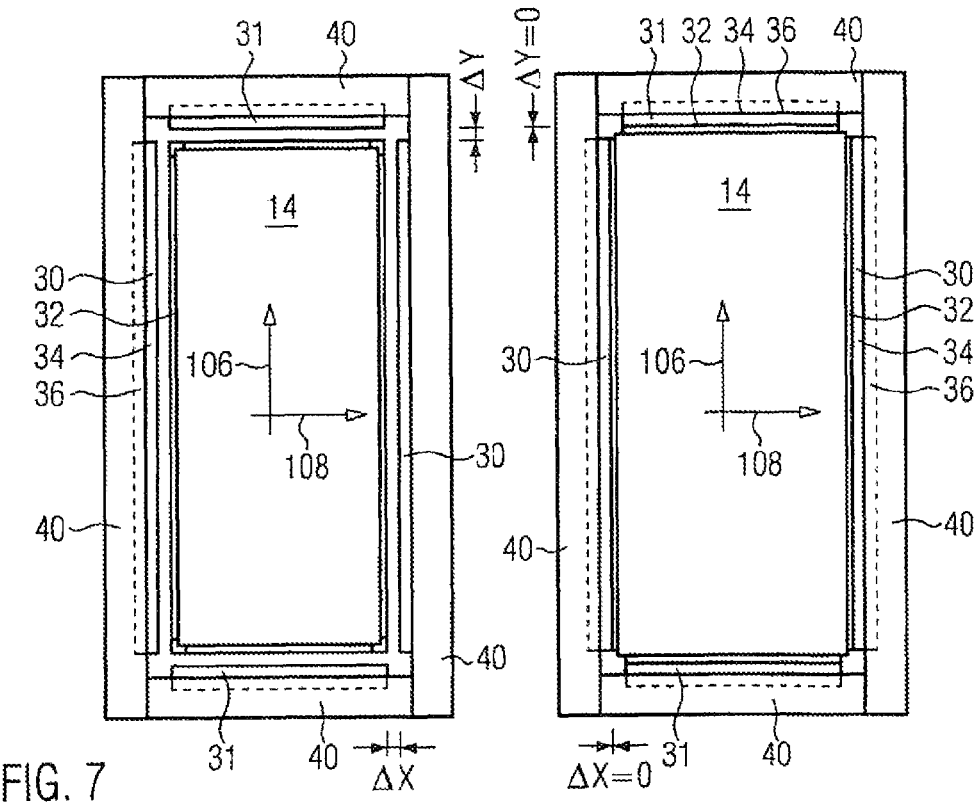
FIG. 7 shows a second embodiment of a lining of the invention.

FIG. 7 shows a lining comprising a membrane element 12 that can be stretched biaxially. The illustration on the left-hand side of FIG. 7 shows the membrane element 12 in an unstretched state. The membrane element 12 comprises a taughtening zip fastener 30 on each of its two longitudinal sides and a further taughtening zip fastener 31 on each of its two transverse sides. Like the taughtening zip fasteners 30, the taughtening zip fasteners 31 each comprise a first and a second closure band 32, 34. Preferably, the taughtening zip fasteners 30 extending in the longitudinal direction and the taughtening zip fasteners 31 extending in the transverse direction are of the same design. Furthermore, they may also exhibit additional features such as those described above with reference to FIGS. 1 to 4.

The taughtening zip fasteners 30, 31 are open in the illustration in the left-hand side of FIG. 7. The taughtening zip fasteners 30, 31 are closed in order to taughten the membrane element 12, as shown in the illustration in the right half of FIG. 7. The membrane element 12 can be stretched with particular ease when connecting members are provided, for example, in the form of connecting straps 35 or access zip fasteners 20, in addition to the taughtening zip fasteners 30, 31.

The taughtening zip fasteners 30 permit simple installation and closing and opening of the membrane element 12 while furthermore, taughtening of the membrane element 12 can take place at the same time as the taughtening zip fasteners are closed. Taughtening of the membrane element 12 in two directions inevitably leads to expanding movements of the membrane element 12 in two directions, which necessarily take place at the borders of the membrane element also, in order to achieve the desired biaxially stretched state. The keder 36 ensures, by means of its sliding capability in the keder groove 44, that the membrane element 12 can be stretched uniformly and biaxially.

Figure 8:
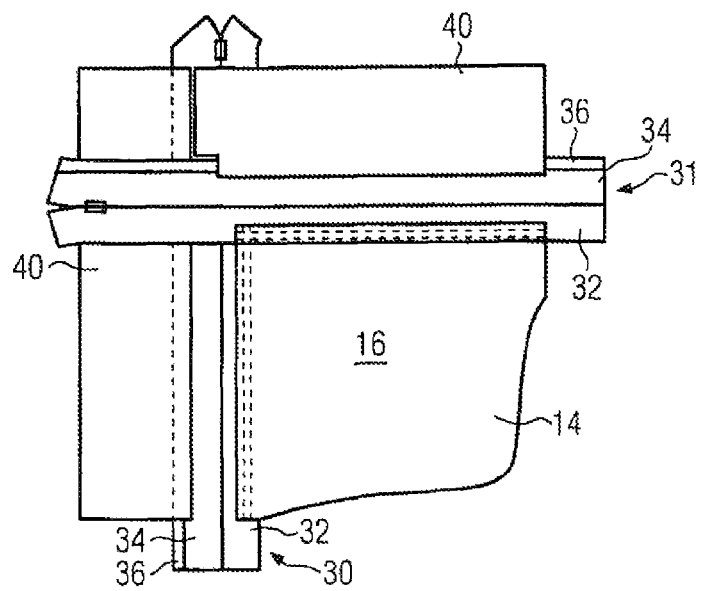
FIG. 8 is a detail of a corner shown in FIG. 7.

FIG. 8 is a detail showing a corner of the embodiment illustrated in FIG. 7. The taughtening zip fasteners 30, 31 are both attached to the reverse side 17 of the membrane 14. The two taughtening zip fasteners 30, 31 overlap in the corner region between the longitudinal and transverse sides of the membrane element 12, with the taughtening zip fastener 31 being on the face side 16 of the taughtening zip fastener 30. For the purpose of stretching the membrane element 12, the taughtening zip fastener 30 extending along the longitudinal direction 106 of the membrane element 12 is closed first. Then the taughtening zip fastener 31 extending in the transverse direction 108 is closed.

Further details of the invention are described below with reference to FIGS. 9 to 19. In these embodiments, a protective cover 80 is provided in addition to the components described above. The lining 10 comprises one or more taughtening zip fasteners 30, 31, as described with reference to FIGS. 1 to 8. The taughtening zip fasteners 30, 31 extend in the longitudinal direction 106 and in the transverse direction 108 respectively for stretching the membrane element 12 biaxially. Furthermore, connecting members are provided in the form of access zip fasteners 20 and/or connecting straps 35.

FIGS. 9 to 17 show the lining 10 on the ceiling of a passenger compartment in the interior of an aircraft. The ceiling represents a surface 110 to be lined.

Figure 11:
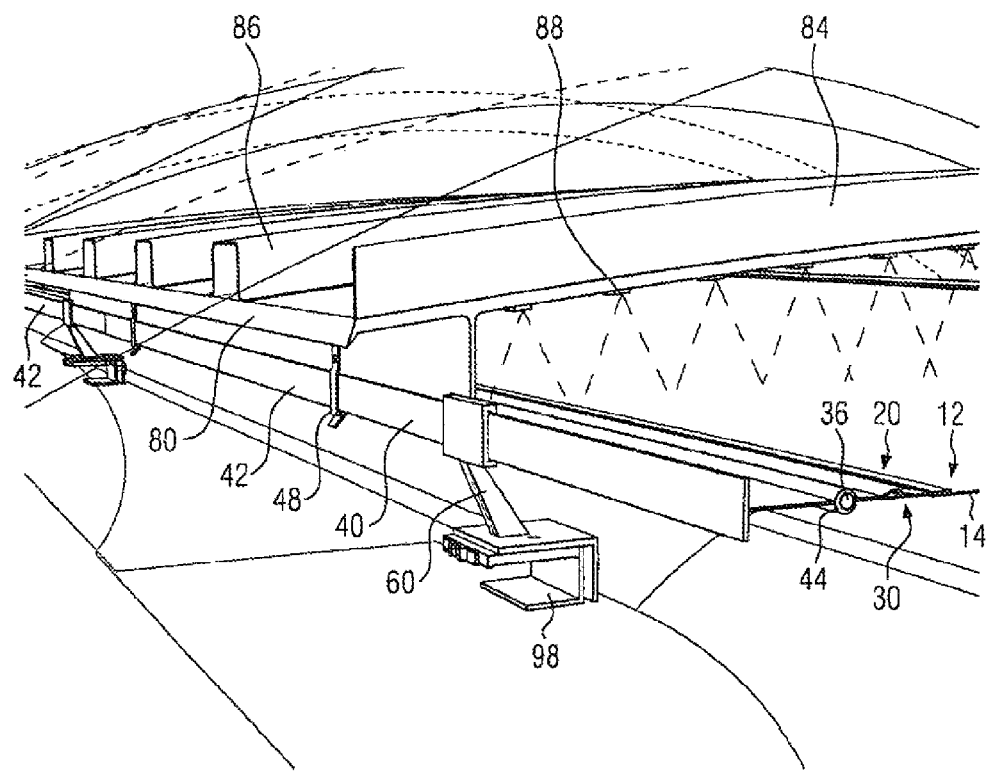
FIG. 11 is a perspective view of a detail of the third embodiment, as seen from the outside.
Figure 12:
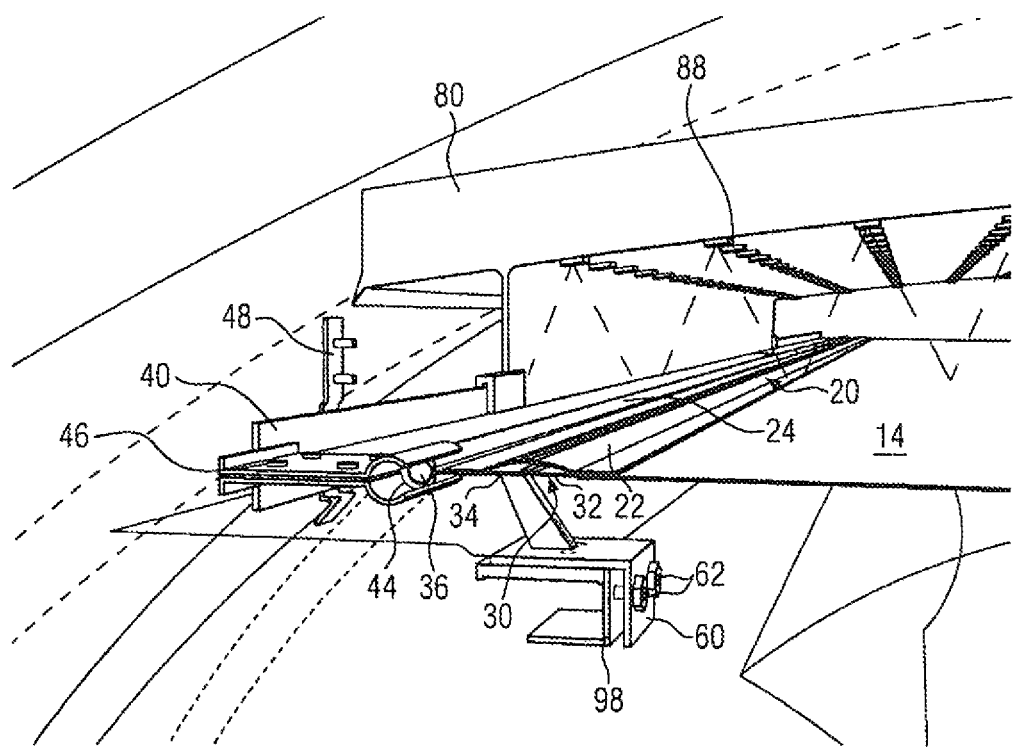
FIG. 12 is a perspective detail view of a detail of the third embodiment, as seen from the inside.
Figure 13:
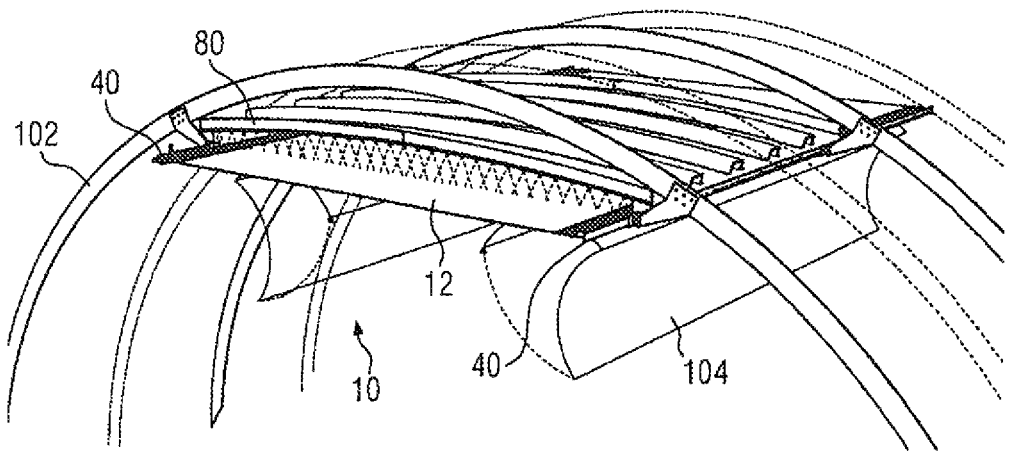
FIG. 13 is a perspective view of a fourth embodiment of a lining of the invention.
Figure 14:
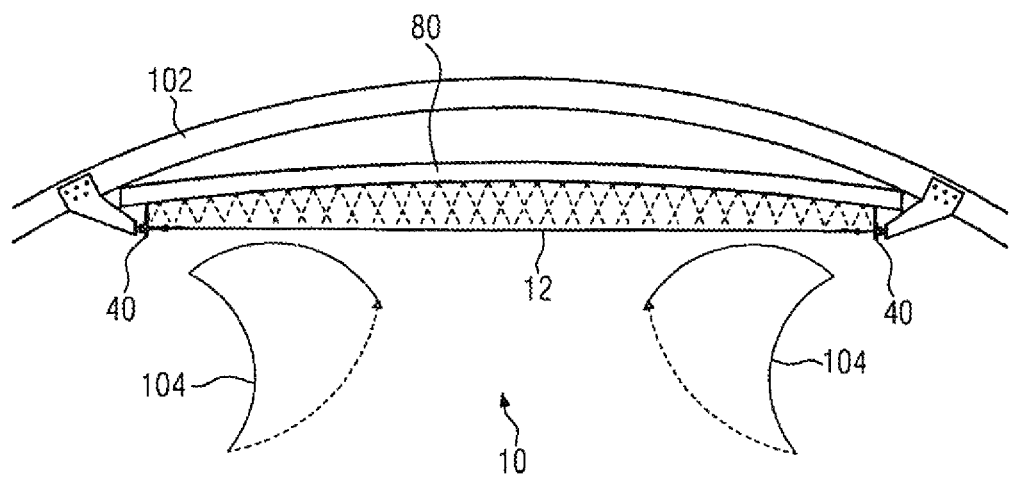
FIG. 14 is a front view of the fourth embodiment.
Figure 15:
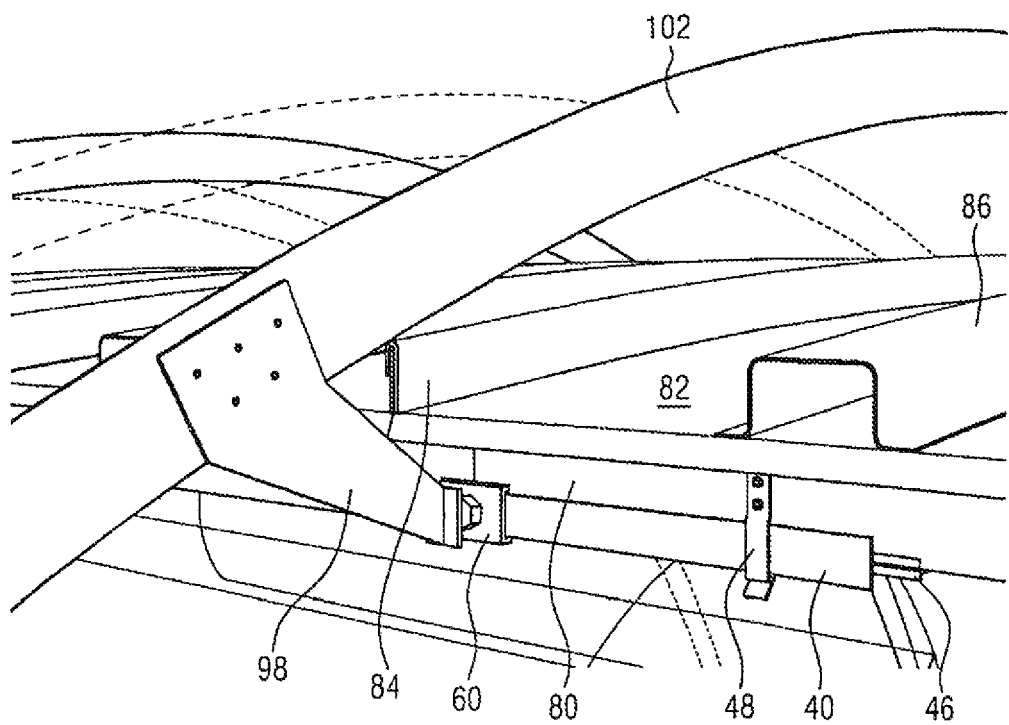
FIG. 15 is a perspective view of a detail of the fourth embodiment, as seen from the outside.
Figure 16:
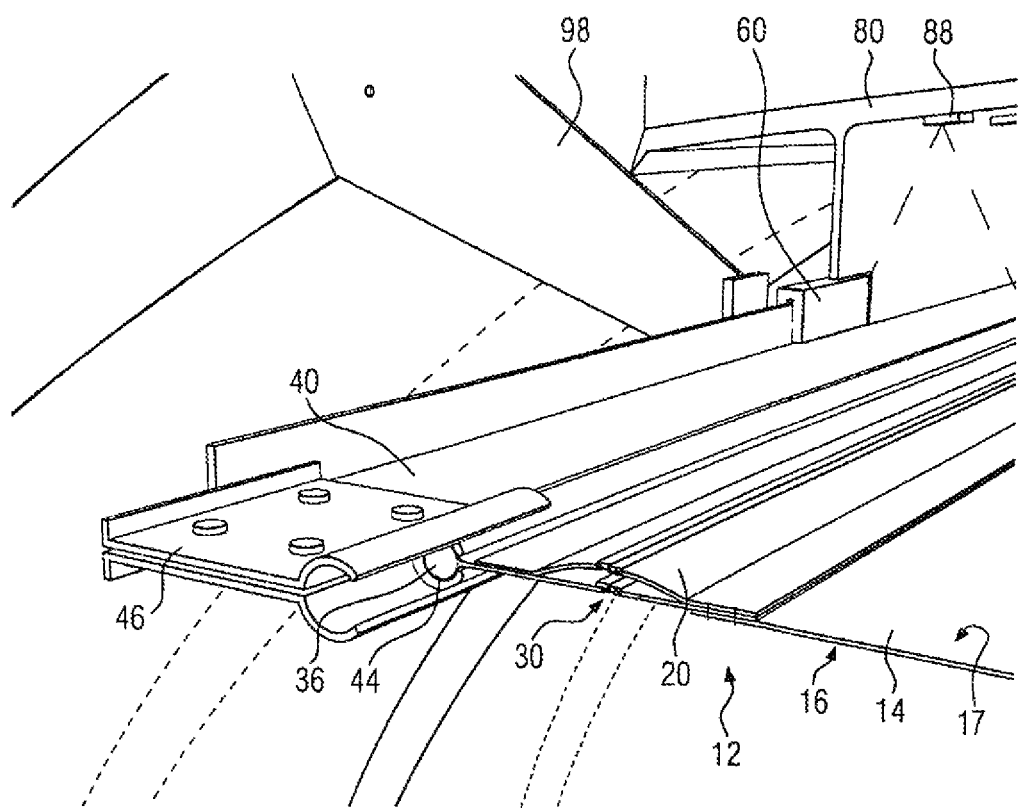
FIG. 16 is a perspective view of a detail of the fourth embodiment, as seen from the inside.

In the third embodiment shown in FIGS. 11 and 12, the lining 10 is attached to luggage racks 104 of the aircraft on a possibly already existing support of a replaceable aircraft ceiling.

The lining 10 comprises a membrane system including two opposing profiled frame elements 40 which are parallel to each other and between which a membrane element 12 can be stretched. Furthermore, the lining 10 comprises a flat protective cover 80 disposed near to and substantially parallel to the membrane element 12.

The profiled frame elements 40 each have a T-shaped cross-section comprising a transverse land and a central longitudinal land, as can be seen, in particular in FIGS. 11 and 12. At the end of the central longitudinal land of the T-shaped frame profile 40, there is provided a keder groove 44 in the form of a profile that rearwardly engages the central longitudinal land. The profiled frame elements 40 and the keder grooves 44 extend in a longitudinal direction 106 of the lining 10 and of the aircraft and can also be referred to as profiled rails or keder rails.

The profiled frame elements 40 are attached at regular intervals to the surface to be lined, more particularly to a mounting base 98 by means of fixing elements 60. The mounting base 98 is formed by several bearing elements that are disposed below the lining 10 and that form the support for the lining 10.

The profiled frame elements 40 are attached to the mounting base 98 and/or to the fixing elements 60 in that they are fixed only at one point in the longitudinal direction 106, and are otherwise mounted for sliding in the longitudinal direction 106. In this way, linear deformation of the aircraft fuselage that can take place under various flight conditions does not strain the profiled frame elements 40.

With regard to cramped conditions that may possibly exist during installation, it may be meaningful to restrict the length of the profiled frame elements 40. For this reason, the profiled frame elements 40 are divided to form a plurality of profiled segments 42 that are joined together so as to align with each other thus forming the complete profiled frame elements 40. Any resulting installation seams or joints are preferably disposed at the moment zero points of the profiled frame elements 40 acting as continuous beams. Connecting members 46 are provided for joining the individual profile segments 42. The connecting members 46 are shaped such that a positive connection of the profile segments 42 is enforced. In this way, the profile segments 42 are prevented from becoming misaligned.

The connecting members 46 each comprise two joint plates which are parallel to each other and between which the profile segments 42 can be clamped. The connecting members 46 likewise comprise a groove-like recess extending around the keder groove 44 of the profiled frame elements 40.

In the exemplary embodiment shown, adjusting means 62 are provided for the purpose of effecting additional stretching and/or of adjusting the tension of the membrane element 12 and also for the purpose of moving at least one of the profiled frame elements 40 in a transverse direction 108. Thus the distance between two profiled frame elements 40 can be altered by actuating the adjusting means 62. The adjusting means 62 are, in the embodiment shown, in the form of adjusting screws. The adjusting means 62 can move the profiled frame elements 40, in particular, relatively to the mounting base 98 in the transverse direction 108.

A protective cover 80 made, in particular, of light metal is provided above the membrane element 12 and at a distance from the same. The protective cover 80 extends between the membrane element 12 and the surface 110 to be lined, i.e., a top region of the fuselage. The protective cover 80 covers an area that is larger than that of the membrane element 12. Specifically, the protective cover 80 protrudes laterally beyond the membrane element 12 and the profiled frame elements 40 disposed along the lateral borders of the membrane element 12.

Particularly for draining off condensation water that may possibly form on a top surface of the lining 10, the protective cover 80 has an arched or curved cross-section. Thus, due to the curvature of the protective cover 80, condensation water that may form on the top surface of the protective cover 80 can flow off to the sides without coming into contact with the membrane element 12.

Furthermore, the protective cover 80 can also comprise a number of cover segments 82 that are joined together to form the complete protective cover 80. One way of joining the individual cover segments 82 to each other consists in the provision of upturns 84 at appropriate border regions on the face sides and along the edges of the individual cover segments 82, each upturn of a cover segment 82 being adapted to engage behind or around an upturn of an adjoining cover segment 82. To this end, each upturn 84 can be U-shaped for example.

For the purpose of stiffening the protective cover 80, stiffening elements 86 can be provided that can extend, in particular, in the transverse direction 108 of the protective cover 80.

Figure 9:
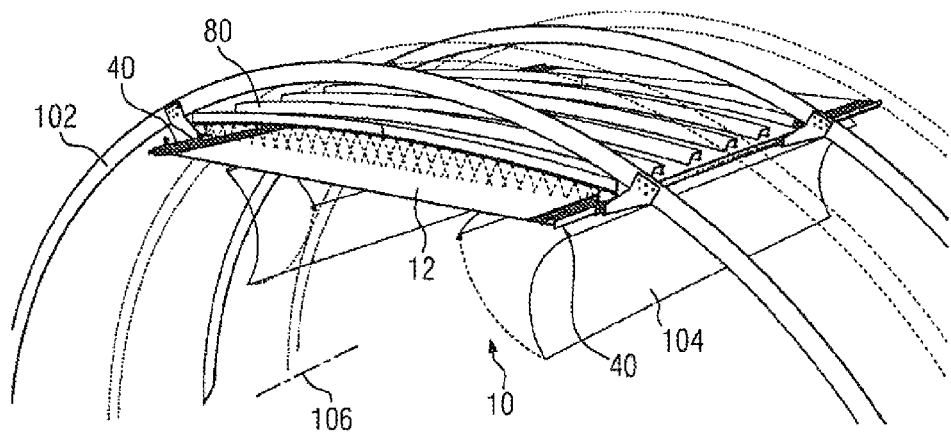
FIG. 9 is a perspective view of a third embodiment of a lining of the invention.
Figure 10:
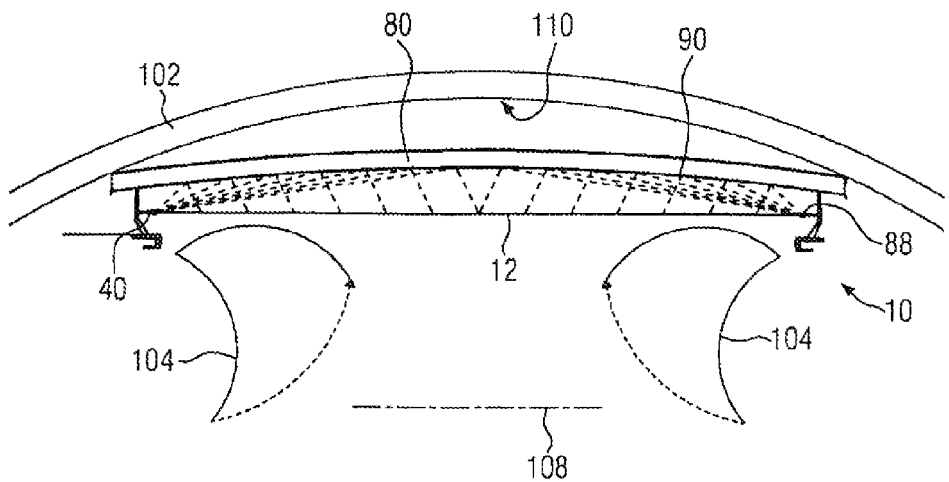
FIG. 10 is a front view of the third embodiment.

The protective cover 80 can comprise a plurality of illuminants 88, for example light emitting diodes, on its underside, or the internal surface near to the membrane element 12, as shown in FIGS. 9, 11 and 12, for example. The illuminants 88 emit light toward the membrane element 12 or the membrane 14, at which the light is scattered. For this purpose, the membrane 14 can be of a photometric fabric. Alternatively, illuminants 88 can also be provided at the edge regions of the lining, more particularly on the profiled frame elements 40, as shown in FIG. 10. The protective cover has a reflector 90 on its underside or internal surface for the purpose of reflecting the light radiated laterally in this way.

The protective cover 80 is attached to the profiled frame elements 40 by means of fixing elements that are formed by clasps 48 in the embodiment shown. The clasps 48 can be screwed, riveted or glued to the protective cover 80. The profiled frame elements 40 can be connected to the clasps 48 by means of a releasable snap-on connection for the purpose of facilitating installation.

A fourth embodiment of a lining 10 of the invention is illustrated in FIGS. 13 to 16. The fourth embodiment differs from the third embodiment in that the lining 10 is not attached to support points above the luggage racks 104 in the interior of the aircraft, but is instead attached to the fuselage itself. The lining 10 can be attached particularly to the frame 102 of an aircraft. For this purpose, there are provided C-shaped retaining elements that form a mounting base 98 for the lining 10. As described with reference to FIGS. 9 to 12, the profiled frame elements 40 are movable relatively to the mounting base 98.

Preferably, the membrane element 12 is a one-piece component and is threaded as a unit by means of its keders into the keder grooves of the profiled frame elements 40. Thus, unlike the profiled frame elements 40 and the protective cover 80, the membrane element 12 is preferably not segmented.

Figure 17:
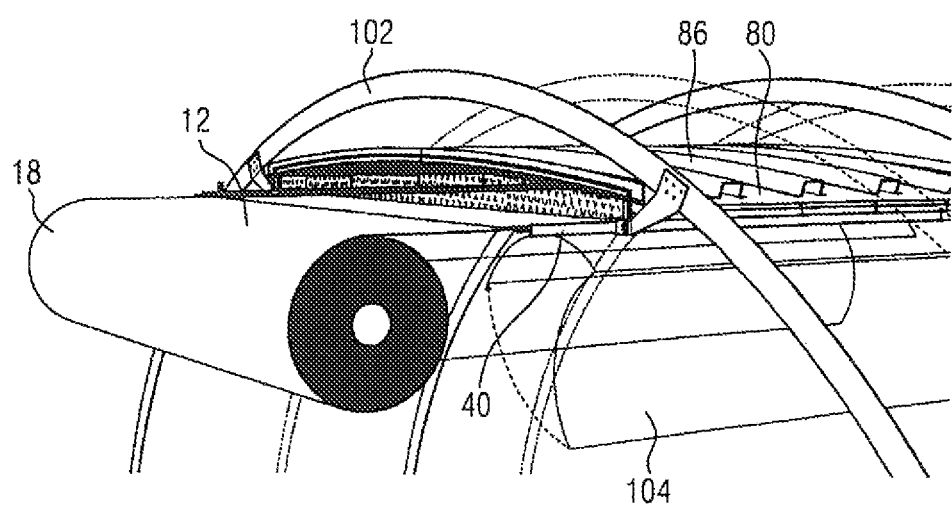
FIG. 17 is a perspective view of a fifth embodiment of a lining of the invention.

Particularly when the membrane 14 cannot be completely removed from the keder 36 by means of the taughtening zip fasteners 30 provided, it is advantageous to roll up the membrane element 12 on a roll 18, as shown in the fifth embodiment in FIG. 17, in order to enable the membrane element 12 to be removed and threaded with ease.

Figure 18:
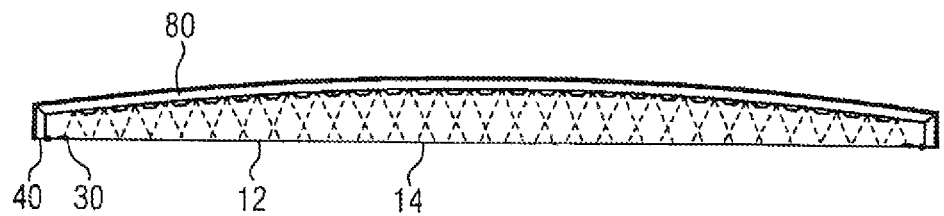
FIG. 18 is a front view of a sixth embodiment of a lining of the invention.
Figure 19:
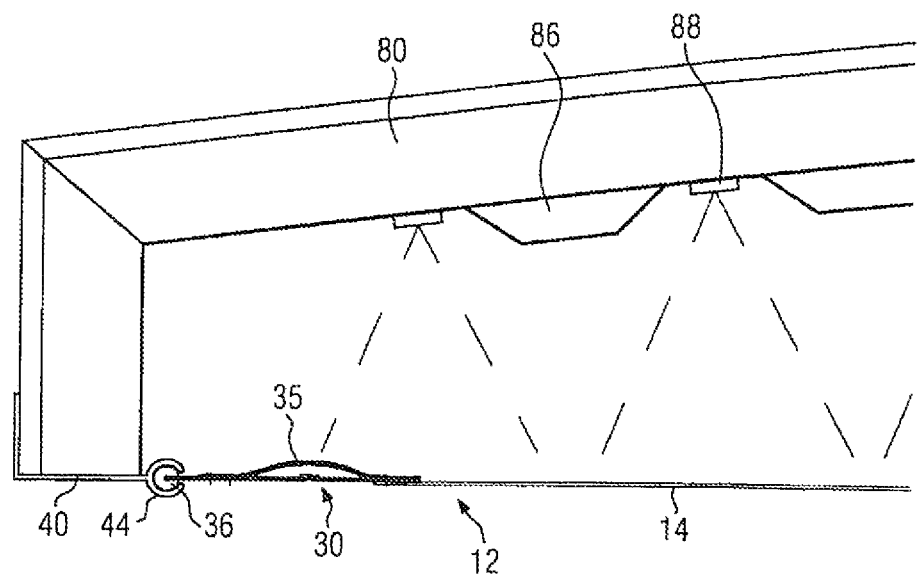
FIG. 19 is a view of a detail of the sixth embodiment.

A sixth example of a lining 10 of the invention is shown in FIGS. 18 and 19. Unlike the third to fifth embodiments, taughtening forces that are transferred from the membrane element 12 to the lateral profiled frame elements 40 are transmitted directly to the protective cover 80 in this variant. To this end, the profiled frame elements 40 are connected permanently to the protective cover 80. The protective cover 80 is configured to be very stiff for the purpose of absorbing the taughtening forces.

In this embodiment, the protective cover 80 can be mounted and dismounted as a complete unit. In order to achieve the necessary stiffness, the protective cover 80 can be provided with stiffening elements 86 or ribs that can absorb the taughtening forces from the membrane element 12 at least partially and preferably completely. The room closure of the protective cover 80 and the cohesion of the ribs can be ensured by means of a thin, cylindrical shell. For example, the shell can be made of sheet metal comprising stiffening ribs.

Furthermore, FIG. 19 shows an embodiment of the taughtening zip fastener 30 comprising a connecting strap 35, as described in detail above with reference to FIG. 6.

The lining of the invention can be installed and taughtened biaxially in a simple manner. Furthermore, the invention provides the possibility of opening and closing entire membrane fields and the simple replacement thereof. The taughtening zip fastener with the integrated keder can facilitate the process of taughtening the membrane element and at the same time provide ease of access to the region behind the membrane element, for example for inspection purposes.

The invention claimed is:

1. A lining for surfaces, comprising
   at least two opposing profiled frame elements extending in a longitudinal direction along the surface to be covered in spaced relationship to each other,
   at least one membrane element disposed between said profiled frame elements and connected to said profiled frame elements, at least partially, by rearwardly engaging fastening means, the rearwardly engaging fastening means including at least one keder connection, and
   at least one taughtening means adapted to taughten said membrane element between said profiled frame elements,
   wherein said membrane element has as taughtening means at least one taughtening zip fastener, wherein a state of said membrane element can be changed, by closing said taughtening zip fastener, from a first, loose state to a second, taughtened state in which the membrane element is held taught between said profiled frame elements,
   wherein said taughtening zip fastener has first and second zip closure bands and at least one connecting member provided between said first and second zip closure bands,
   wherein the first zip closure band is formed along an edge region of a membrane of the membrane element, and wherein the second zip closure band includes a keder, disposed in the keder connection, and longitudinally movable in the keder connection in the first, loose state,
   wherein the first zip closure band is closed prior to insertion of the keder of the second zip closure band in the keder connection of the rearwardly engaging fastening means, and wherein the second zip closure band is subsequently closed after insertion of the keder in the keder connection to provide the taughtened state of the membrane element,
   wherein a gap between said zip closure bands is restricted by the connecting member when said taughtening zip fastener is open and wherein, when said zip-fastener is closed, the connecting member is relieved of tension.

2. The lining as defined in claim 1, wherein
   at least one first pair of profiled frame elements and a second pair of profiled frame elements are provided, said second pair of profiled frame elements being transversely to said first pair of profiled frame elements, and said membrane element can be taughtened biaxially between said profiled frame elements.

3. The lining as defined in claim 2, wherein
   at least two taughtening zip fasteners are provided for the purpose of biaxially taughtening said membrane element, wherein a first taughtening zip fastener extends in the direction of said first pair of profiled frame elements and a second taughtening zip fastener extends in the direction of said second pair of profiled frame elements.

4. The lining system as defined in any one of claims 1 to 3, wherein
   at least two taughtening zip fasteners are provided which are substantially parallel to each other.

5. The lining as defined in claim 1, wherein said connecting member comprises a textile strip disposed along said taughtening zip fastener.

6. The lining as defined in claim 1 or claim 5, wherein said connecting member comprises an access zip fastener disposed along said taughtening zip fastener.

7. The lining as defined in claim 6, wherein said taughtening zip fastener and said access zip fastener are arranged such that a pretensioned state of said membrane element is attained by closing said access zip fastener and a taughtened state thereof is attained by subsequently closing said taughtening zip fastener.

8. The lining as defined in claim 1, wherein said membrane element, when in a loose state and/or a pretensioned state with the taughtening zip fastener open, can move freely between said profiled frame elements.

9. The lining as defined in claim 1, wherein at least one of said profiled frame elements is capable of movement for the purpose of additionally taughtening and/or adjusting said membrane element.

* * * * *